M. MINTZ.
DIAPHRAGM VALVE.
APPLICATION FILED DEC. 2, 1908.

1,035,803.

Patented Aug. 13, 1912.

Witnesses:

Inventor:
Mike Mintz
by Buckley, Durand & Durand
Attys

UNITED STATES PATENT OFFICE.

MIKE MINTZ, OF ROCK ISLAND, ILLINOIS.

DIAPHRAGM-VALVE.

1,035,803.  Specification of Letters Patent.  Patented Aug. 13, 1912.

Application filed December 2, 1908. Serial No. 465,628.

*To all whom it may concern:*

Be it known that I, MIKE MINTZ, a citizen of the United States of America, and resident of Rock Island, Rock Island county, Illinois, have invented a certain new and useful Improvement in Diaphragm-Valves, of which the following is a specification.

My invention relates to improvements in diaphragm valves, and is especially applicable for use in connection with air compressors, and has for its object, the production of a device by means of which the pressure of air under the diaphragm may be restored to atmospheric.

A further object is the provision of means whereby the air passing through the device, may be cleaned and purified.

A further object is the production of a simple and efficient device of few parts, that can be cheaply constructed and one that is not liable to get out of order.

These and such other objects as may hereinafter appear, are attained by my device, an embodiment of which is shown in the accompanying drawing.

Figure 1:
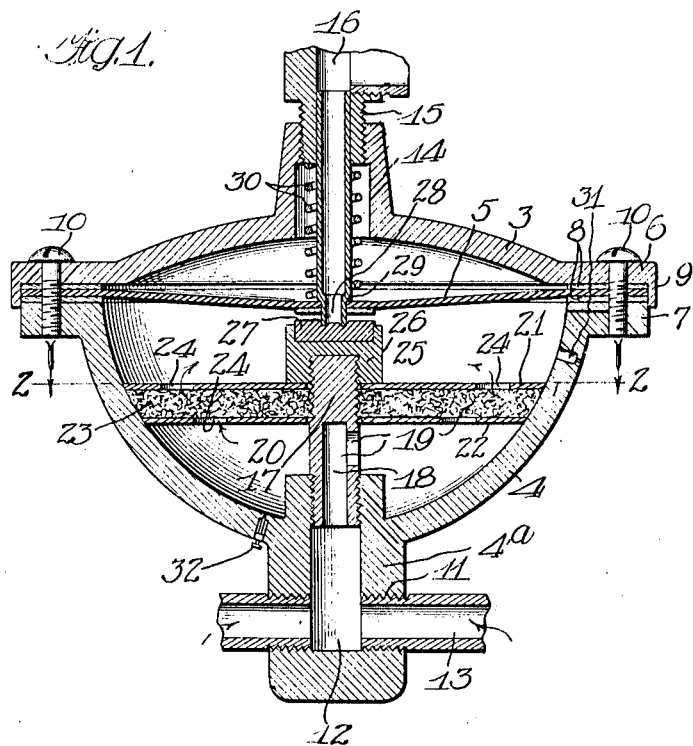
Figure 2:
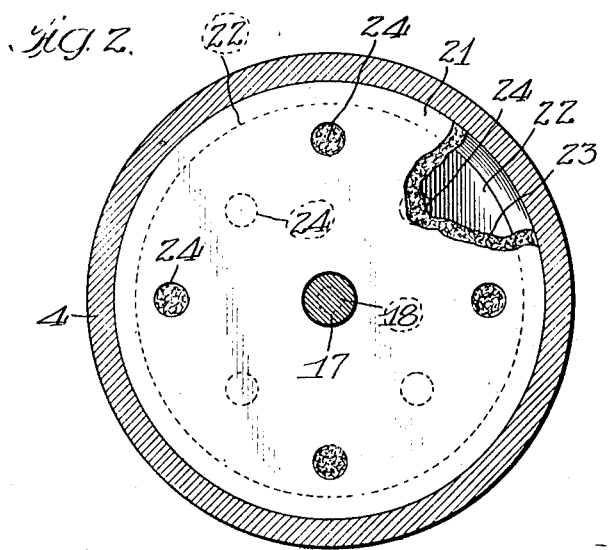

Figure 1, represents a sectional half of my device. Fig. 2 represents a sectional view on the line 2—2 of Fig. 1 looking in the direction indicated by the arrows, a portion of the device being broken away.

Like numerals of reference indicate like parts in the several figures of the drawing.

Referring now to the drawings; the diaphragm shell comprises an upper casing 3 and a lower casing 4, between which is secured a diaphragm 5. These casings are provided with bearing flanges 6—7; circular washers 8 are provided between the diaphragm and the flanges and a circumferential flange 9 extends downwardly from the outside of the flange 6, serving to make a more perfect joint between the casings. Screw bolts 10 pass through the bearing flanges and the diaphragm, holding the casings securely together. The lower casing terminates in a hollow boss or stem 4ᵃ and threaded passages 11 communicate with the passage 12 in the boss in which are screwed the pipes or tubes 13, from the compressed air pump. The upper casing is also provided with a hollow boss or stem 14, within which a threaded nipple 15 screws. This nipple is hollow and the passage 16 therein, communicates with the compressed air tank.

Referring now to the interior of the diaphragm casing, a hollow valve post 17 is screwed into the hollow boss 4ᵃ and the passage 18 therein communicating with the passage 12, and also through an opening 19, with the lower diaphragm chamber 20. Seated in the diaphragm chamber are a pair of disks 21—22 of different diameters, thus leaving a space within the disks which is filled with some absorbent material 23. These disks are provided with a plurality of openings 24, and are so fitted into place that the openings in the two disks are in staggered relation to each other. These disks are provided with central openings, permitting the valve post 17 to extend upward into the middle diaphragm chamber 25. A valve-seat support 26 is mounted on the top of the post in which is located a valve-seat 27. The diaphragm 5 is also provided with a central opening, permitting the passage of the tube or valve 28. A shoulder 29 rests on the top of the diaphragm and this tube is mounted to slide within the passage 16, being fitted loosely therein, and a slight clearance being provided between the tube and the nipple 15, thus providing a passage for the air between this tube and the upper diaphragm chamber. A spring 30 surrounds the tube, restoring the valve to its seat when the pressure within the lower chamber is reduced to a predetermined point. The greater pressure in the upper chamber forces the diaphragm down and keeps the valve closed. The spring 30 therefore is primarily of use to temporarily close the valve. It will be understood, of course, that the diaphragm 5 being made of spring-like material the spring 30 can be eliminated entirely from my mechanism, the excess pressure in the upper chamber of the diaphragm holding the valve 28 in place against the seat 27 after the valve 28 is closed.

In order to permit the pressure below the diaphragm to return to that of the atmosphere, when the valve 28 is closed, I provide a small port or valve 31 opening into the air, and in order to draw off any oil that may work up into the diaphragm, I provide a small valve 32 communicating with the lowest part of the lower diaphragm chamber. Of course, the port 31 and the valve 32 might be combined and one small drain tube serve to carry off the oil and compressed air, but I consider the structure as shown much better and more satisfactory.

It will be seen that I have provided a valve in which the atmospheric pressure may be quickly attained below the diaphragm, and also one in which the air forced through the valve is cleansed and purified.

It is a fact that the oil and other impurities are often carried in suspension with the air, when it is forced into the tank. This is an especially objectionable feature when the air is used in dentistry or in the aeration of or for forcing the flow of beverages. By the use of the absorbent pad or filling, the air may be cleansed and purified and if desired the pad may be medicated or saturated with perfume, thus imparting a pleasant odor or flavor to the air. This feature is an especially valuable one in the case of the use of air for the treatment of disease.

The port 31 is preferably made by first drilling a hole nearly through the shell and then withdrawing the drill and driving a needle-pointed instrument through the shell at the point where the drill-hole comes to a tapering point. This forms a port so small that it is invisible from the outside, but sufficiently large to permit the escape of air from the lower chamber. The area of this port is so small in comparison to the area of the inlets and pumps that although air may be constantly escaping from the port the amount of air being raised is so much greater that any desired pressure can be developed even against this small seepage. I have thus devised a means of relieving the pressure from the under side of the diaphragm.

It is evident that many modifications may be made that will accomplish these results, but all such as contemplate the speedy return to atmospheric pressure on the under side of the diaphragm, or the purifying of the air between the pump and the tank or vacuum chamber, come within the spirit of my invention.

While I have illustrated my invention in connection with an air compressor, it will be understood that the various features of my invention are likewise adapted for use, with minor changes, as a vacuum pump, and I therefore do not wish to limit myself to any one specific use.

I claim:

1. In a device of the class described, the combination with a diaphragm casing, a diaphragm dividing the interior of said casing into an upper and lower chamber, a valve communicating with the lower chamber, and means for restoring the pressure within said chamber to atmospheric when said valve is closed.

2. In a device of the class described, the combination with a diaphragm casing, a diaphragm dividing the interior of said casing into an upper and lower chamber, a valve communicating with the lower chamber, and means for restoring the pressure within said chamber to atmospheric when said valve is closed, together with means for withdrawing impurities from the air passing through said chamber.

3. In a device of the class described, the combination with a diaphragm casing, a diaphragm dividing the interior of said casing into an upper and lower chamber, a valve communicating with the lower chamber, and means for restoring the pressure within said chamber to atmospheric when said valve is closed, together with means for withdrawing impurities from the air passing through said chamber, said means comprising a layer of absorbent material located between the inlet and the outlet.

4. In a device of the class described, the combination with a diaphragm casing, a diaphragm dividing the interior of said casing into an upper and a lower chamber, a valve communicating with the lower chamber, and means for restoring the pressure within said chamber to atmospheric, when said valve is closed, together with means for withdrawing impurities from the air passing through said chamber, said means comprising a pair of perforated disks spaced apart and fitting within said lower chamber, the space between said disks being filled with absorbent material.

5. In a device of the class described, the combination with a diaphragm casing, a diaphragm dividing the interior of said casing into an upper and lower chamber, a valve communicating with the lower chamber, and means for restoring the pressure within said chamber to atmospheric, when said valve is closed, together with means for withdrawing impurities from the air passing through said chamber, said means comprising a pair of perforated disks, spaced apart and fitting within said lower chamber, the space within said disks being filled with absorbent material, and perforations in said disks being placed in staggered relation to each other.

6. In a device of the class described, the combination with a diaphragm casing, a diaphragm dividing the interior of said casing into an upper and lower chamber, a spring controlled valve communicating with the lower chamber, and means for restoring the pressure within said chamber to atmospheric, when said valve is closed.

7. In a device of the class described, the combination with a diaphragm casing, a diaphragm dividing the interior of said casing into an upper and lower chamber, a spring controlled valve communicating with the lower chamber, and means for restoring the pressure within said chamber to atmospheric, when said valve is closed, together with means for withdrawing impurities from the air passing through said chamber.

8. In a device of the class described, the combination with a diaphragm casing, a diaphragm dividing the interior of said casing into an upper and lower chamber, a spring controlled valve communicating with the lower chamber, and means for restoring the pressure within said chamber to atmospheric, when said valve is closed, together with means for withdrawing impurities from the air passing through said chamber, said means comprising a layer of absorbent material located between the inlet and the outlet.

9. In a device of the class described, the combination with a diaphragm casing, a diaphragm dividing the interior of said casing into an upper and lower chamber, a spring controlled valve communicating with the lower chamber and means for restoring the pressure within said chamber to atmospheric, when said valve is closed, together with means for withdrawing impurities from the air passing through said chamber, said means comprising a pair of perforated disks spaced apart and fitting within said lower chamber, the space between said disks being filled with absorbent material.

10. In a device of the class described, the combination with a diaphragm casing, a diaphragm dividing the interior of said casing into an upper and lower chamber, a spring controlled valve communicating with the lower chamber, and means for restoring the pressure within said chamber to atmospheric, when said valve is closed, together with means for withdrawing impurities from the air passing through said chamber, said means comprising a pair of perforated disks spaced apart and fitting within said lower chamber, the space within said disks being filled with absorbent material, and perforations in said disks being placed in staggered relation to each other.

11. In a device of the class described, the combination with a diaphragm casing, a diaphragm dividing the interior of said casing into an inner and lower chamber, a valve communicating with the lower chamber, and means for restoring the pressure within said chamber to atmospheric when said valve is closed, said means comprising a needle-point port from said lower chamber to the atmosphere.

12. In a device of the class described, the combination with a diaphragm casing, a diaphragm dividing the interior of said casing into an upper and lower chamber, a valve communicating with the lower chamber, and means for restoring the pressure within said chamber to atmospheric when said valve is closed, said means comprising a port extending from the interior of said lower chamber and communicating with the atmosphere through a needle-point opening.

13. In a device of the class described, the combination with a diaphragm casing, a diaphragm dividing the interior of said casing into an upper and lower chamber, a valve communicating with the lower chamber, and means for restoring the pressure within said chamber to atmospheric when said valve is closed, said means comprising a port in said lower chamber, a spring for temporarily seating said valve and closing communication between said chambers.

14. In a device of the class described, the combination with a diaphragm casing, a diaphragm dividing the interior of said casing into an upper and lower chamber, a valve communicating with the lower chamber, and means for restoring the pressure within said chamber to atmospheric when said valve is closed, said means comprising a port in said lower chamber, a spring for temporarily seating said valve and closing communication between said chambers, the excess of pressure in said upper chamber relieving the tension on said spring and holding said valve in closed position.

15. In a device of the class described, the combination with a diaphragm casing, a diaphragm dividing the interior of said casing into an upper and lower chamber, a valve communicating with the lower chamber, and means for restoring the pressure within said chamber to atmospheric when said valve is closed, and for carrying off any accumulated oil within said chamber, said means comprising a port extending from the interior of said lower chamber and communicating with the atmosphere through a needle-point opening.

16. In a device of the class described, the combination with a diaphragm casing, a diaphragm dividing the interior of said casing into an upper and lower chamber, a valve communicating with the lower chamber, and means for restoring the pressure within said chamber to atmospheric when said valve is closed, and for carrying off any accumulated oil within said chamber, said means comprising a port in said lower chamber, a spring for temporarily seating said valve and closing communication between said chambers.

17. In a device of the class described, the combination with a diaphragm casing, a diaphragm dividing the interior of said casing into an upper and lower chamber, a valve communicating with the lower chamber, and means for restoring the pressure within said chamber to atmospheric when said valve is closed, and for carrying off any accumulated oil within said chamber, said means comprising a port in said lower chamber, a spring for temporarily seating said valve and closing communication between said chambers, the excess of pressure in said upper chamber relieving the tension on said spring and holding said valve in closed position.

18. In a device of the class described, the combination with a diaphragm casing, a diaphragm dividing the interior of said casing into an upper and lower chamber, a spring controlled valve communicating with the lower chamber, and means for restoring the pressure within said chamber to atmospheric, when said valve is closed, together with means for withdrawing impurities from the air passing through said chamber, said means comprising a pair of perforated disks spaced apart and fitting within said lower chamber, the space within said disks being filled with absorbent material, and perforations in said disks being placed in staggered relation to each other, said means for restoring the pressure to atmospheric also serving to remove accumulated oil from said chamber.

19. In a device of the class described, the combination with a diaphragm casing, a diaphragm dividing the interior of said casing into an upper and lower chamber, a spring controlled valve communicating with the lower chamber and means for restoring the pressure within said chamber to atmospheric, when said valve is closed, and for withdrawing accumulated oil from said lower chamber, together with means for withdrawing impurities from the air passing through said chamber, said means comprising a pair of perforated disks spaced apart and fitting within said lower chamber, the space between said disks being filled with absorbent material.

20. In a device of the class described, the combination with a diaphragm casing, a diaphragm dividing the interior of said casing into an upper and lower chamber, a valve communicating with the lower chamber, and means for restoring the pressure within one of said chambers to atmospheric when said valve is closed.

21. In a device of the class described, the combination with a diaphragm casing, a diaphragm dividing the interior of said casing into an upper and lower chamber, a valve communicating with the lower chamber, and means for restoring the pressure within one of said chambers to atmospheric when said valve is closed, together with means for withdrawing impurities from the air passing through said chamber.

22. In a device of the class described, the combination with a diaphragm casing, a diaphragm dividing the interior of said casing into two separate chambers, valve communication between said chambers, and means for restoring atmospheric pressure within one of said chambers, when said valve is closed, said means comprising a port from the interior of said chamber to atmosphere.

23. In a device of the class described, the combination with a diaphragm casing, a diaphragm dividing the interior of said casing into two separate chambers, valve communication between said chambers, and means for restoring atmospheric pressure within one of said chambers, when said valve is closed.

24. In a device of the class described, the combination with a diaphragm casing, a diaphragm dividing the interior of said casing into an upper and lower chamber, a valve communicating with the lower chamber, and means for restoring atmospheric pressure within said chamber, when said valve is closed, and for carrying off any accumulated oil within said chamber, said means comprising a port in said lower chamber.

25. In a device of the class described, the combination with a diaphragm casing, a diaphragm dividing the interior of said casing into two separate chambers, valve communication between said chambers, and means for restoring atmospheric pressure within one of said chambers when said valve is closed, and for withdrawing accumulated oil and other impurities from said chamber.

26. In a device of the class described, the combination with a diaphragm casing, a diaphragm dividing the interior of said casing into two separate chambers, valve communication between said chambers, and means for restoring atmospheric pressure within one of said chambers, when said valve is closed, and for carrying off oil and other impurities from said chamber, said means comprising a port in said chamber.

27. In a device of the class described, the combination with a diaphragm casing, a diaphragm dividing the interior of said casing into an upper and lower chamber, a valve communicating with the lower chamber, and means for restoring the pressure within said chamber to atmospheric when said valve is closed, said means comprising a port in said lower chamber.

28. In a device of the class described, the combination with a diaphragm casing, a diaphragm dividing the interior of said casing into two separate chambers, valve communication between said chambers, and means for restoring atmospheric pressure within one of said chambers, when said valve is closed, together with means for withdrawing impurities from the air passing therethrough.

29. In a device of the class described, the combination with a diaphragm casing, a diaphragm dividing the interior of said casing into two separate chambers, a valve communicating with one of said chambers, and means for restoring atmospheric pressure within one of said chambers, when said valve is closed, said means comprising a port from the interior of said chamber to atmosphere.

30. In a device of the class described, the combination with a diaphragm casing, a diaphragm dividing the interior of said casing into two separate chambers, a valve communicating with one of said chambers, and means for restoring atmospheric pressure within one of said chambers, when said valve is closed.

31. In a device of the class described, the combination with a diaphragm casing, a diaphragm dividing the interior of said casing into two separate chambers, a valve communicating with one of said chambers, and means for restoring atmospheric pressure within one of said chambers when said valve is closed, and for withdrawing accumulated oil and other impurities from said chamber.

32. In a device of the class described, the combination with a diaphragm casing, a diaphragm dividing the interior of said casing into two separate chambers, a valve communicating with one of said chambers, and means for restoring atmospheric pressure within one of said chambers, when said valve is closed, and for carrying off oil and other impurities from said chamber, said means comprising a port in said chamber.

33. In a device of the class described, the combination with a diaphragm casing, a diaphragm dividing the interior of said casing into two separate chambers, a valve communicating with one of said chambers, and means for restoring atmospheric pressure within one of said chambers, when said valve is closed, together with means for withdrawing impurities from the air passing therethrough.

Signed by me at Chicago, Illinois, this 30th day of October 1908.

MIKE MINTZ.

Witnesses:
J. NORBY,
CLARENCE E. TAYLOR.